United States Patent [19]

Chambers et al.

[11] Patent Number: 4,762,524

[45] Date of Patent: Aug. 9, 1988

[54] COMPOSITION COMPRISING THE ADDITION PRODUCT OF A VINYL-SULFONE DYE AND A SECONDARY AMINE AND PROCESS FOR DYEING A POLYAMIDE THEREWITH

[75] Inventors: Thomas V. Chambers, Rock Hill, S.C.; Manfred Deicke, Charlotte, N.C.; Suzanne C. Fleming, Warwick, R.I.

[73] Assignee: Hoechst Celanese Corporation, Somerville, N.J.

[21] Appl. No.: 11,171

[22] Filed: Feb. 5, 1987

[51] Int. Cl.[4] .................. C09B 62/04; C09B 62/20; C09B 67/00
[52] U.S. Cl. ............................. 8/549; 8/527; 8/591; 8/597; 8/602; 8/924
[58] Field of Search ............... 8/549, 591, 597

[56] References Cited

U.S. PATENT DOCUMENTS 3,802,837  4/1974  Bohnert et al. .................. 8/547

Primary Examiner—A. Lionel Clingman
Attorney, Agent, or Firm—Hugh C. Crall

[57] ABSTRACT

This invention is directed to a dyestuff composition comprising the reaction product of a water-soluble, vinyl-sulfone type, reactive dye and a N-alkyl-amino-alkyl sulfonic acid and/or carboxylic acid or the salts thereof wherein the N-alkyl-amino-alkyl acid or salt is reacted with said dye in an amount of about 0.5 to 1.0 mole per mole of dye. This dyestuff composition is used to dye synthetic polyamides according to a process where said composition is applied to a polyamide fiber from an aqueous solution having a pH from about 3 to about 4; preferably 3.5 and then fixed to said fiber by heat.

29 Claims, No Drawings

COMPOSITION COMPRISING THE ADDITION PRODUCT OF A VINYL-SULFONE DYE AND A SECONDARY AMINE AND PROCESS FOR DYEING A POLYAMIDE THEREWITH

BACKGROUND OF THE INVENTION

The invention is directed to water-soluble, fiber-reactive dyestuff compositions and a process for using these compositions to dye polyamide fibers. The fiber-reactive, water-soluble dyestuffs useful in the practice of this invention are those of the vinyl-sulfone type which are well known. In the dyeing of a polyamide fiber, the vinyl sulfone group forms a chemical bond with the amino groups of the fiber which fixes the dye to the fiber by a strong covalent chemical bond.

The chemical bonding of the dye molecule to the fiber by means of the vinyl sulfone group has many advantages. However, the vinyl-sulfone reactive dyes have not gained acceptance in the dyeing of polyamide. This is because it is difficult to get well-penetrated, level, uniform dyeings especially with two or three color mixtures. The vinyl-sulfone type dyes tend to selectively concentrate on one portion of the fiber leaving other portions deficient in that color either due variations in the fiber's morphology or the strike rate of the dye or a combination of both. This problem is particularly evident in the dyeing of polyamide materials where the fiber is highly extended, for example, in nylon carpet or rug materials and where the dyeing is done by the continuous method.

In the art, a dyestuff's initial diffusion and reactivity properties are characterized as its "strike" rate and as used in this description it is intended to characterize the initial dyeing rate or uptake of a dye by a substrate in the early stages of the dyeing process. The stroke rates of reactive vinyl-sulfone type dyestuffs towards polyamide fibers makes them unacceptable for many commercial polyamide dyeing applications, both in exhaust and continuous dyeing procedures where the acid dyes are more commonplace. Acid dyestuffs, however, form a salt bond with the polyamide which is susceptible to breaking under the influence of moisture and heat which results in a loss or bleeding of the dye—i.e. reduced fastness.

The dyestuff compositions of this invention comprise the reaction product of vinyl-sulfone type reactive dyes with N-alkyl-amino-alkyl sulfonic and carboxylic acids or their salts, wherein mole ratio of the above secondary amine is about 0.5 to about 1 mole for each mole of vinyl-sulfone type dye. These compositions when applied to polyamides by the process of this invention at a pH value of 3 to 4 provide uniform, level, well-penetrated dyeings having superior fastness properties.

U.S. Pat. No. 3,802,837 teaches that the reaction product of 1.5 to 4 moles of N-methyltaurine per mole of vinyl-sulfone type dye has increase solubility and increased reactivity in the exhaust dyeing of wool at a pH of 5. We have found that vastly improved polyamide dyeings can be achieved at reduced material cost using the dyestuff compositions and process of this invention.

SUMMARY OF THE INVENTION

This invention is directed to water-soluble, fiber-reactive dyestuff compositions comprising the addition product of a vinyl-sulfone type dye and a secondary amine compound containing a sulfonic acid or carboxylic acid moeity and the water-soluble salts thereof.

The vinyl-sulfone type dye useful in the preparation of the compositions are represented by the formula: $D-(SO_2-Z)_n$ wherein D represent a dye chromophore selected from the anthraquinone, dioxazine, formazon, phthalocyanine, and the mono and dis azo series and their metal complexes; Z represents a fiber-reactive group, preferably the sulfatoethylsulfone group and n is an integer of 1 or 2. Suitable metallizing agents are copper, cobalt and iron, preferably copper.

The secondary amine compounds useful in preparing the dyestuff compositions of the invention are the N-alkyl-amino-alkyl-sulfonic and carboxylic acids, their water-soluble salts and mixtures thereof. A particularly preferred secondary amine is N-methyltaurine.

The above described secondary amines are reacted with the fiber reactive vinyl-sulfone substituents of the dye to modify the strike rate of dye. Approximately 0.5 to 1.0 mole of secondary amine is used per mole of vinyl-sulfone type dye in preparing the dyestuff compositions of the invention. The amount of secondary amine required to obtain an acceptable strike rate is determined experimentally for each dye.

The dyestuff compositions of the invention are used to dye synthetic polyamides to obtain uniform, level well penetrated dyeings. The vinyl-sulfone type dyes (unmodified) do not produce acceptable synthetic polyamide dyeings; however, the dyestuff compositions of the invention do when applied to the polyamide fiber from an aqueous solution having a pH value from about 3 to 4.

DESCRIPTION OF THE PREFERRED EMBODIMENTS

The vinyl-sulfone, fiber-reactive dyestuff compositions of this invention comprise the reaction product of the vinyl sulfone substituent of a vinyl-sulfone type dye and an N-alkyl-amino-alkyl sulfonic acid, N-alkyl-amino-alkyl carboxylic acid or the salts thereof. The vinyl-sulfone type reactive dyes useful in the practice of the invention are well known. Suitable dyes of the vinyl-sulfone type may be represented by the following general formula:

$$D-(SO_2-Z)_n$$

In the above formula, D represent a dye chromophore selected from the anthraquinone, dioxazine, formazon, phthalocyanine; mono and disazo series and their metal complexes wherein the metal is selected from copper, chromium, iron and cobalt; preferably copper. Z represents the fiber-reactive groups, $-CH=CH_2$ and $-CH_2-CH_2-Y$; wherein Y is a substituent capable of being split off by an alkaline reagent; e.g. hydroxy, chlorine, bromine, thiosulfato, sulfato, phosphato, acyloxy, dimethylamino, diethylamino; preferably sulfato. The term "n" represents an integer from 1 to 3; preferably 1 to 2. The dye chromophore D may contain additional fiber-reactive groups e.g. a monohalogen-s-triazine, or mono, di, or trihalogen pyrimidine, a mono or dichloroquinoxaline, a dichlorophthalazine, a dichloropyridazone or the bromine and fluorine derivatives thereof. Particularly, preferred are those chromophores of the monoazo and disazo series and their metal complexes.

The vinyl-sulfone type reactive dyes are well known as demonstrated by the following patent publications:

U.S. Pat. No. 4,336,190 (formazon); U.S. Pat. No. 4,492,654 (disazo); U.S. Pat. No. 4,046,754 (monoazo); U.S. Pat. No. 4,577,015 (dioxazine); U.S. Pat. Nos. 4,049,656; 3,359,286 (anthraquinone); U.S. Pat. No. 3,268,548 (phthalocyanine) and U.S. Pat. No. 3,385,843 (monoazo-pyrazolone) which are incorporated herein by reference. Similarly, the reaction of vinyl-sulfone type reactive dyes with secondary aliphatic amines containing sulfonic or carboxylic acid groups is known, see, U.S. Pat. No. 3,802,837 which is incorporated herein by reference, see particularly, column 1, lines 50–69, column 2, lines 1–11.

The vinyl-sulfone type dyes are manufactured by known processes and sold as dyestuff powders of standard colormetric strength containing about 50 percent by weight of the active dye, or liquid dyestuffs of standard strength containing about 10–12.5 percent of dye. In the case of the dyestuff powders, the remainder of the ingredients are essentially inert salts (sodium sulfate, sodium choride, etc.) and in the dyestuff liquid the remainder being water and inert salt. For the purpose of this description, these mixtures are called a dyestuff, the active component thereof, a dye and the reaction product of the vinyl-sulfone type dyestuff and the secondary amine, a dyestuff composition.

The secondary aliphatic amines useful in the invention are the N-alkyl-amino-alkyl sulfonic acids, N-alkyl-amino-alkyl carboxylic acids and their water-soluble salts. These compounds may be represented by the general formula:

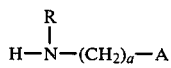

$$H-\underset{\underset{R}{|}}{N}-(CH_2)_a-A$$

wherein: A represents a sulfonic acid or carboxylic acid moiety or a water-soluble salt thereof; R represents a lower alkyl of 1 to 5 carbons and "a" represents an integer from 1 to 25 preferably a is 1 to 5, most preferably 1 to 2.

Exemplary secondary amines useful in the invention are N-alkyl-aminoacetic acid, N-alkyl-aminopropanoic acid, N-alkyl-aminobutanoic acid, N-alkyl-aminopentanoic acid, N-alkyl-aminoethanesulfonic acid and the water soluble salts thereof. Particularily preferred are the N-alkyl-amino-alkyl sulfonic acids, most preferably N-methyltaurine or its sodium salt. Other typical water soluble salts include those of alkali metal series; e.g., lithium, potassium. In the following description, the above N-alkyl-amino-alkyl acids and their salts are called "secondary amines".

The polyamide substrates useful in the process of this invention are those derived from the fiber-forming, synthetic polyamides which contain free amino groups. Exemplary polyamides are nylon-6 (polycaprolactan), nylon-6,6 (poly(hexamethylene adipamide), nylon-11, nylon-12, nylon-6/6,6, nylon-6,12 etc. Particularily, preferred polyamides are the nylon-6 and nylon-6,6 polyamides, nylon-6/6,6 copolymers and blends thereof.

The dyestuff compositions of the invention are prepared by the addition reaction of a vinyl-sulfone type dye and the described secondary amines. The dyestuff and secondary amine or its salt are dissolved in an aqueous medium in the desired stiochiometric amount and reacted at a pH value greater than 7, preferably 9 or higher. In this pH range the vinyl-sulfone form of the fiber-reactive substituent (SO$_2$—Z) is formed which reacts with the secondary amine. Any reasonable reaction temperature may be used, for instance, from 20°–100° C. The reaction time is temperature and pH dependent; e.g. at 88°–92° C., and pH 9 the reaction is completed in about 5–10 minutes while at pH 12–12.5 the reaction can be completed in about 5 minutes at room temperature. The reaction mixture is then neutralized to a pH value of about 4 to 6, preferably about 5 and adjusted with water or an inert salt to the desired concentration. The dyestuff compositions of the invention may be stored as aqueous solutions for up to six months without any noticeable precipitate formation and may be supplied to the end user as an aqueous solution of standard strength. Alternatively, the compositions of the invention may be prepared at a dyeing plant from the vinyl-sulfone type dyestuff and the secondary amine compound either in situ in the dye bath or in a separate reaction vessel.

Preferably, the addition product in the dyestuff composition is prepared at the dyestuff manufacturing plant. Here, the vinyl-sulfone dyestuff is prepared in the conventional manner and prior to isolating it, the secondary amine is added in the required amount. The addition reaction of the secondary amine and the vinyl-sulfone substituent can be conducted at this point or at the dyeing plant.

The dyestuff compositions of the invention comprises the reaction product of about 0.5 mole to about 1 mole of a N-alkylamino-alkyl sulfonic acid and/or N-alkyl-amino-alkyl carboxylic acid or their salts as previously defined per mole of vinyl-sulfone type dye. The stoichiometric quantity of secondary amine compounds required is dependent on number of substituents capable of reacting or complexing with the amine. The minimum molar quantity of amine is about 0.5 mole per mole of vinyl-sulfone substituent in the dye molecule. Thus, if the dye molecule contains two vinyl-sulfone substituents about one mole of amine is required. Similarly, if the dye is metallized e.g. a copper complexed monoazo dye, additional secondary amine can be required depending on how strongly the metal is complexed. If metal complexes a portion of the secondary amine, additional amine is required to react with the vinyl-sulfone substituent; generally, the molar ratio with metal complexed dyes is about 0.7 to about 1 mole per mole of dye.

The stoichiometric amount of amino compound is determined experimentally since the vinyl-sulfone type dyestuffs are complex reaction mixtures as is the mechanism of their affinity and reactivity with substrates. In a monochromatic dyeing with a dye containing a single vinyl-sulfone substituent, the secondary amine is initially used at a mole ratio of about 0.6 moles of secondary amine per mole of dye. A dyeing of a substrate is conducted and observed for uniformity, penetration and levelness. In order to more easily observe the uniformity of the dyeing an extended fibrous substrate is used, i.e. a rug or carpet substrate. If the dyeing is unsatisfactory e.g. the tip of the fiber contains a high concentration of the color, additional amine is used (in increments of about 0.1 mole) to slow down the strike rate of the dyestuff composition. If the surface of substrate is deficient in color, less amine is used to increase its strike rate. The strike rate of the dyestuff composition is adjusted in this manner (increasing or decreasing the amount of amine) until an uniform, level dyeing is obtained.

In a dichromatic or trichromatic dyeing each of the two or three dyestuff compositions is prepared at about 0.6 moles of secondary amine per mole of dye; a dyeing of the mixed dyestuff compositions is made and observed. If one color is striking too fast or too slow, the amount of amine reactant relative to that color is adjusted until approximately equal strike rates are obtained for each dye in the mixture and an uniform dyeing is achieved.

It is possible and within the scope of this invention to prepare individual dyestuff compositions having more than 1 mole of secondary amine reactant per mole of dye and then mixing those compositions in aqueous solution with other dyestuff compositions having less than one mole such that on the average the total composition contains about 0.5 to about 1 mole of secondary amine reactant per mole of dye.

The following table illustrates the amount of secondary amine required with exemplary vinyl-sulfone type dyes. Dye formulae illustrated in this description are shown in their free acid form, however, it is apparent that the water-soluble salts thereof are within the scope of this invention.

Amount of Secondary Amine Per Mole of Dye

| Vinyl-Sulfone Type Dye | | N—methyltaurine |
|---|---|---|
| I. | [structure] | |
| II. | [structure] | 0.5 |
| III. | [structure] | 0.7 |
| IV. | [structure] | 1.0 |
| V. | [structure] | 0.9 |

| Vinyl-Sulfone Type Dye | | | N—methyltaurine |
|---|---|---|---|
| VI, VII | 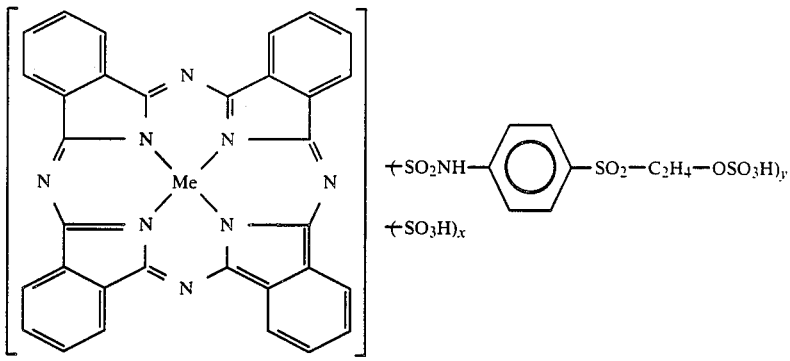 | $-\text{SO}_2\text{NH}-\!\!\!\bigcirc\!\!\!-\text{SO}_2-\text{C}_2\text{H}_4-\text{OSO}_3\text{H})_y$  $-(\text{SO}_3\text{H})_x$ | |
| VI. | | Me = Cu$^{+2}$ X = 2 Y = 2 | 1.1 (0.6/Vs) |
| VII. | | Me = Cu$^{+2}$ X = 1.5 Y = 1.5 | 0.9 (0.6/Vs) |

In the above table the following abbreviations are used:
Vs = the sulfatoethylsulfone group (—SO$_2$—CH$_2$—CH$_2$—OSO$_3$H)
Me = Cu Exemplary dyes useful in the invention are obtained by coupling the base and coupling reactants set forth below by methods well known in the art.

| Amino Base | Coupling Reactant | Metal |
|---|---|---|
| Monazo Dyes | | |
| 1-amino-2-methoxy-4-((2-sulfooxyethyl)sulfonyl)5-methylbenzene | 1-acetoacetylamino-3-methyl-6-methoxybenzene-4-sulfonic acid | — |
| 1-amino-2,5-dimethoxy-4-((2-sulfooxyethyl)sulfonyl)benzene | 1-acetoacetylamino-3-methyl-6-methoxybenzene-4-sulfonic acid | — |
| 2-amino naphthalene-1,5-disulfonic acid | 1-(4'-[(2-sulfooxyethyl) phenyl]sulfonyl)-3-methyl-5-pyrazolone | — |
| 1-amino-4-((2-sulfooxyethyl) sulfonyl) benzene | 1-(4'-sulfophenyl)-3-carboxy-5-pyrazolone | — |
| 1-hydroxy-2-amino-4-((2-sulfooxyethyl) sulfonyl) benzene | 1-(4'-sulfophenyl)-3-methyl-5-pyrazolone | Copper |
| 1-amino-2,5-dimethoxy-4-((2-sulfooxyethyl) sulfonyl) benzene | 1-(4'-sulfophenyl)-3-methyl-5-pyrazolone | — |
| 1-amino-2-methoxy-4-((2-sulfooxyethyl) sulfonyl)-5-methyl benzene | 1-(4'-sulfophenyl)-3-methyl-5-pyrazolone | — |
| 1-amino-4-((2-sulfooxyethyl) sulfonyl) benzene | N,N—bis-(2-sulfooxyethyl)-3-chloro aniline | — |
| 1-amino-2,5-dimethoxy-4-((2-sulfooxyethyl) sulfonyl) benzene | 1-(4'-sulfophenyl)-3-methyl-5-pyrazolone | — |
| 1-amino-4-((2-sulfooxyethyl) sulfonyl) benzene | 2-acetylamino-5-hydroxynaphthalene-7-sulfonic acid | — |
| 1-amino-4-((2-sulfooxyethyl) sulfonyl) benzene | 3-acetylamino-5-hydroxynaphthalene-7-sulfonic acid | — |
| 2-amino-8-((2-sulfooxyethyl) sulfonyl) naphthalene-1-sulfonic acid | 2-acetylamino-5-hydroxynaphthalene-7-sulfonic acid | — |
| 1-amino-4-((2-sulfooxyethyl) sulfonyl) benzene | 1-benzoylamino-8-hydroxynaphthalene-4,6-disulfonic acid | — |
| 2-amino-6-((2-sulfooxyethyl) sulfonyl) naphthalene-1-sulfonic acid | 1-benzoylamino-8-hydroxynaphthalene-4,6-disulfonic acid | — |
| 2-amino-8-((2-sulfooxyethyl) sulfonyl) naphthalene-1-sulfonic acid | 1-acetylamino-8-hydroxynaphthalene-3,6-disulfonic acid | — |
| 1-amino-2-hydroxy-4-((2-sulfooxyethyl) sulfonyl) benzene | 1-hydroxynaphthalene-4-sulfonic acid | Copper |
| 1-amino-2-hydroxy-4-((2-sulfooxyethyl) sulfonyl) benzene | 1-acetylamino-8-hydroxynaphthalene-3,6-disulfonic acid | Copper |
| 1-hydroxy-2-amino-4-((2-sulfooxyethyl) sulfonyl) benzene | 1-amino-8-hydroxynaphthalene-2,4-disulfonic acid | — |
| 1-amino-2,5-dimethoxy-4-((2-sulfooxyethyl) sulfonyl) benzene | 1-acetylamino-8-hydroxynaphthalene-3,6-disulfonic acid | Copper |
| 1-amino-2-hydroxy-4-((2-sulfooxyethyl) sulfonyl) benzene | 1-amino-8-hydroxynaphthalene-3,6-disulfonic acid | Copper |
| 1-hydroxy-2-aminobenzene-4-sulfonic acid | 1-amino-8-hydroxynaphthalene-3,6-disulfonic acid | Copper |
| 2-amino-8-((2-sulfooxyethyl)sulfonyl) naphthalene-1-sulfonic acid | 1-acetylamino-8-hydroxynaphthalene-3,6-disulfonic acid | Copper |
| 1-amino-2-hydroxy-4-((2-sulfooxyethyl) sulfonyl) benzene | 1-amino-8-hydroxynaphthalene-3,6-disulfonic acid | Copper |
| 1-amino-2-hydroxy-4-((2-sulfooxyethyl) sulfonyl) benzene | 1-(4'-sulfophenyl)-3-carboxy-5-pyrazolone | Copper |
| 1-hydroxy-2-aminobenzene-4 sulfonic acid | 1-(4'-[2-sulfooxyethyl) phenyl] sulfonyl)-3-methyl-5-pyrazolone | Copper |
| DISAZO DYES | | |
| 1-hydroxy-2-amino-4-((2-sulfooxyethyl) sulfonyl) benzene 2-amino-5-hydroxynaphthalene-7-sulfonic acid | 1-acetylamino-8-hydroxynaphthalene-3,6-disulfonic acid | Copper |
| 1-amino-2-hydroxy-4-((2-sulfooxyethyl) sulfonyl) benzene | 1-amino-8-hydroxynaphthalene-3,6-disulfonic acid | Copper |

-continued

| Amino Base | Coupling Reactant | Metal |
| --- | --- | --- |
| 1-amino-4-((2-sulfo-oxyethyl) sulfonyl benzene | | |
| 1-hydroxy-2-amino-4-((2-sulfooxyethyl) sulfonyl) benzene | 1-amino-8-hydroxy-naphthalene-3,6-disulfonic acid | Copper |
| 1-aminobenzene-2,5-disulfonic acid | | |
| 1-hydroxy-2-amino-4-((2-sulfooethyl) sulfonyl) benzene | 2-amino-8-hydroxy-naphthalene-6-sulfonic acid | — |
| 1-amino-8-hydroxy-naphthalene-2,4-disulfonic acid | | |

Other exemplary vinyl-sulfone type dyes useful in the invention are
1-hydroxy-2-(2'-sulfonic acid phenylazo)-8-(5''-chloro-3''-(4'''-((2-sulfooxyethyl)sulfonyl)phenylamino)-s-triazinylamino)naphthalene-3,6-disulfonic acid
6,13-dichloro-3,10-bis-((2-sulfooxyethyl)amino)-4,11-bis-((2-sulfooxyethyl)sulfonyl)-triphenodioxazine
Copper complex of 2'-carboxy-2''-hydroxy-5''-((2-sulfooxyethyl)sulfonyl)-1,3,5-triphenylformazon-5',3''-disulfonic acid
Copper [29H,31H-phthalocyaninato(2-)-$N^{29},N^{30},N^{31},N^{32}$]-sulfo[[4-[[2-(sulfooxy)ethyl]sulfonyl]phenyl]amino]sulfonyl derivatives This invention also directed to a process for dyeing or printing a synthetic polyamide fiber which comprises applying to said polyamide fiber a water-soluble dyestuff composition which is the reaction product of a vinyl-sulfone type dye and at least one secondary amine selected from N-alkyl-amino-alkyl-sulfonic acid, N-alkyl-amino-alkyl-carboxylic acid or a water-soluble salt thereof. In this dyestuff composition, the molar ratio of said secondary amine reactant to said vinyl-sulfone type dye is about 0.5 to about 1 mole per mole of dye. The dyestuff composition is applied to said fiber at a pH from about 3–4, preferably about 3.5 from an aqueous solution and then fixed to the fiber by heat. At this pH range the addition product of the secondary amine and the vinyl-sulfone dye reverts to its individual component i.e., dye and secondary amine.

The process parameters are the pH value of the dyebath and the stoichiometric quantity of secondary amine to vinyl-sulfone type dye. If the dyeing is conducted below or above a pH range of about 3–4, unsatisfactory results are obtained. If the secondary amine is employed in an insufficient amount, the dye will strike too fast and when used in excess the strike rate is too slow which results in nonuniformity of the dye shade.

The above process is particularly suited for the continuous dyeing of synthetic polyamides. The dyestuff composition in aqueous solution at a pH of about 3 to 4 is padded or sprayed onto the subtrate and then fixed to the fiber by heat at a temperature of about 75°–110° C. A certain amount of moisture must be present during the fixing process, either from the padding solution or by addition to the substrate; preferably the fixing of the dye is carried out using saturated steam.

In the exhaust procedure the dyestuff composition of the invention is applied at liquor ratio between 3:1 and 30:1 and a temperature from about 35° C. to 130° C., preferably between 60°–95° C. The dyeing is again conducted at a pH from about 3 to 4; preferably about 3.5.

The standard dyeing auxillaries may be employed e.g. wetting agents, leveling agents, thickners etc. These compounds and their use is well known to those in the art.

The following examples are presented to illustrate the invention; percentage are percent by weight unless otherwise noted.

EXAMPLES

Example 1

A standardized dyestuff in an amount of 5.0 grams containing approximately 2.4 grams ($4.5 \times 10^{-3}$ moles) of a vinyl-sulfone type dye of the formula:

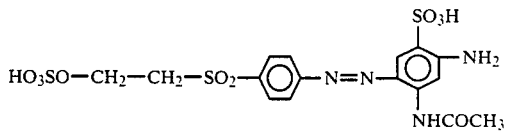

and 0.6 grams of a 65 percent by weight powder of the sodium salt of N-methyltaurine were dissolved in 100 ml of water containing 0.5 grams of trisodium phosphate. The pH of the solution was approximately 9. The solution was then heated to 88°–92° C. and held in that temperature range for approximately 10 minutes. Acetic acid was then added until the pH was 5 and water was added to dilute the solution to a total volume of 500 ml containing 0.01 grams of standardized dyestuff per ml.

An aliquot of 2.0 ml of the above solution was added to approximately 38 ml of water containing a wetting agent (0.3 gm) and leveling agent (0.04 gm) and the pH was adjusted to 3.5 with acetic acid. The concentration of wetting agent and leveling agent were 7.5 and 1.0 grams per liter respectively. The concentration of dyestuff—0.5 grams per liter is expressed based upon the original 5.0 grams of standardized dyestuff used to prepare the secondary amine derivative. A nylon 6, tufted carpet test specimen in the amount of 10 grams was padded with 40 grams of the dyestuff solution (400% wet pick up) and the test specimen was steamed for 4 minutes with saturated steam. The dyed substrate was rinsed with water and dried.

The dyeing was of excellent shade uniformity. This procedure simulates a continuous pad dyeing process with excellent correlation.

Example 2

The dyestuff solution of Example 1 was used in the exhaust procedure to dye three 10-gram, nylon-6, carpet specimens using a 20:1 liquor ratio. These exhaust dyeings were conducted at 0.5%, 1.0%, 2.5% dyestuff concentrations. The dyestuff concentration is weight percent based upon the substrate as are the percentages of the dyeing auxillaries which are set forth below.

In each dyeing, the following general procedure was used. Water, dyeing auxillaries and substrate were charged to a dyeing vessel. The bath temperature was approximately 35° C. and the pH was adjusted to pH 3.5 with acetic acid. The contents of the bath were agitated for 10 minutes and the dyestuff solution was added in an amount necessary to produce dyestuff concentrations of 0.5%, 1.0% and 2.5% for the respective dyeings.

After addition of the dyestuff, the agitation was continued for 10 minutes and then the contents of the dye bath were heated to 94° C. at a rate of 1–2° C./minute. The temperature was held at 94° C. for 1.0 hour. The contents of the bath were then cooled to 66° C., rinsed with water and dried. The amount of dyeing auxillaries employed are set forth below for each dyeing wherein the percentages are based upon the weight of the substrate. In the 2.5% dyeing, the dyed fabric was scoured with an aqueous solution of 1-2% scouring agent for 15-20 minutes at 82° C.

DYEING AUXILLARIES USED FOR DYEING

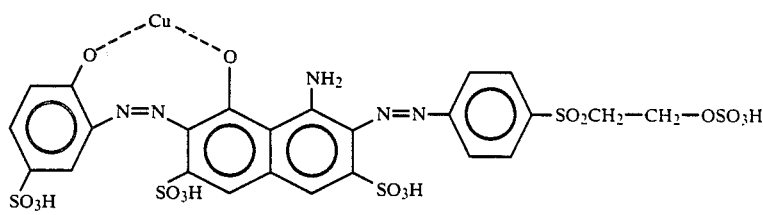

| Dyeing Auxillary | DYESTUFF CONCENTRATION - % | | |
|---|---|---|---|
| | 0.5 | 1.0 | 2.5 |
| Leveling Agent - % | 2 | 1.5 | 1.0 |
| Anti-Migration Agent - % | 4 | 3.0 | 2.0 |

Each of the above dyed substrates were of excellent shade uniformity and the dye bath exhaust was essentially 100% in each case.

EXAMPLE 3

The procedure of Example 1 was repeated except the standardized dyestuff starting material contained a vinyl-sulfone type dye of the formula:

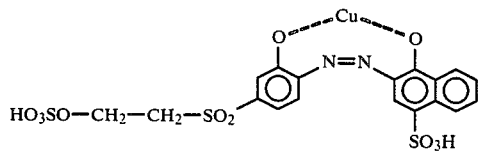

Five grams of this standardized dyestuff contained approximately $3.7 \times 10^{-3}$ mole of dye. The molar ratio of active dye to the N-methyltaurine sodium salt was 1:0.8 respectively.

A dyeing was conducted with the dyestuff composition produced above usiang a dyeing procedure substantially in accordance with that of Example 1. The dyed substrate was level and of excellent shade uniformity.

EXAMPLE 4

The N-methyltaurine-vinyl-sulfone addition product dyestuff composition of Example 3 was employed to dye three substrates using a procedure substantially in accordance with that set forth in Example 2.

Again the dyed nylon-6 substrates were level and of excellent shade uniformity.

EXAMPLE 5

The procedure of Example 1 was repeated using a dyestuff containing a vinyl-sulfone type dye of the following structure:

Five grams of this dyestuff contained $2.5 \times 10^{-3}$ moles of the vinyl-sulfone type dye which were reacted with $2.4 \times 10^{-3}$ moles of the N-methyltaurine sodium salt. The molar ratio was 1:1 of dye to secondary amine.

Dyeings using the above dyestuff composition were made substantially in accordance with the procedures set forth in Examples 1 and 2. In each dyeing, the substrate exhibited superior shade uniformity and levelness.

EXAMPLE 6

A standard strength dyestuff in the amount of 5.0 grams was dissolved in 100 ml of water together with 0.6 grams of a 65% powder of the sodium salt of N-methyl-aminoethane sulfonic acid. The dye employed in this example had the following formula:

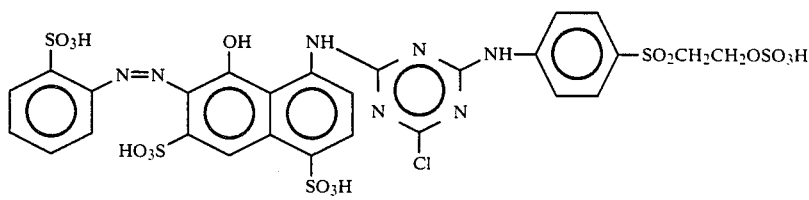

The molar ratio of dye to secondary amine was 1:0.7, respectively.

The pH of the above solution was adjusted to approximately 12.5 by the addition of trisodium phosphate while mixing which was continued for 5 minutes at room temperature to allow for completion of the addition reaction. After five minutes of reaction time, the pH of the solution was adjusted to 5 with acetic acid and from this point the procedure of Example 1 was followed.

The dye nylon-6 substrate was of excellent shade uniformity.

EXAMPLE 7

The procedure of Example 6 was repeated using a dye of the following formula:

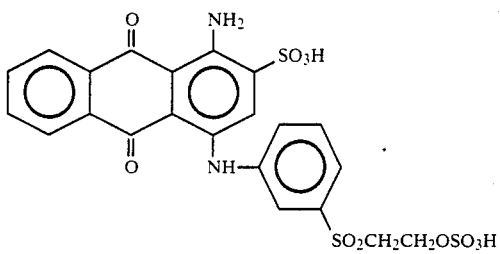

The molar ratio of dye to secondary amine employed in this Example was 1:0.5, respectively.

The dyeing of this example was of excellent shade uniformity.

EXAMPLE 8

Example 7 was repeated using a dye of the following formula:

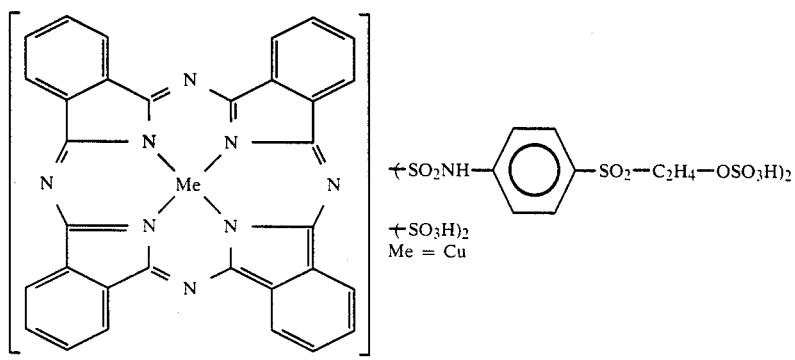

The molar ratio of dye to secondary amine was 1:08, respectively. The dyed nylon-6 specimen was of excellent shade uniformity.

EXAMPLES 10-17

Example 1, 2, 3, 4, 5, 6, 7 and 8 were repeated using nylon-6,6 test specimens. In all cases, the dyeing were of excellent quality and superior shade uniformity.

EXAMPLE 18

A trichromatic dyeing was prepared from the following dyestuff compositions:

| Dye | N—methyltaurine | Color |
|---|---|---|
| [azo dye structure with Vs, NHCOCH3, NH2, SO3H] | 0.5 | Yellow |
| [Cu-complex azo dye with Vs, SO3H] | 0.8 | Red |
| [Cu-complex disazo dye with Vs, SO3H, NH2] | 1.0 | Blue |

Vs = —SO₂CH₂CH₂—O—SO₃H

The dyestuff composition of each of the above dyes were prepared substantially in accordance with the procedure of Example 1. The molar ratio of dye to N-methyltaurine are as set forth above. An aqueous padding solution of these dyestuff compositions was prepared and applied to nylon-6 substrates at a total concentration of 1.5 grams per liter (0.5 g/l of each dyestuff composition) using the procedure of Example 1 except the pH of the padding solution was varied. Dyeings were made at pH 2.5, 3.0, 3.5, 4.0 and 5.0

The dyeings made in the pH range of 3–4 were uniform and level with the dyeing made at pH 3.5 the best. The sample dyed at pH 2.5 showed the yellow component being blocked and not fixing to the fiber. The dyeing was not uniform with the fibers having reddish tips and greener/bluer bases. The dyeing at pH 5.0 showed the blue component being blocked and a very unlevel dyeing from the tip of the fibers to their base.

EXAMPLE 19

The procedure of Example 18 was repeated except the molar ratio of N-methyltauriane to dye was 2.75 to 1, respectively. These dyeings were compared to the dyeing of Example 18 and they were inferior to the dyeings of Example 18 being unlevel from the tip to the base of the fiber.

We claim:

1. A dyestuff composition comprising the addition product of a fiber reactive, water-soluble dye of the formula:

$$D-(SO_2-Z)_n$$

wherein D represents a dye chromphore selected from the anthraquinone, dioxazine, formazon, phthalocyanine, monoazo and disazo series and their metal copper, chromium, cobalt or iron complexes;

wherein Z represents the group $-CH=CH_2$ or $CH_2-CH_2-Y$; wherein Y is a substituent, capable of being split off by an alkaline reagent, selected from hydroxy, chloro, bromo, thiosulfato, sulfato, acyloxy, dimethylamino and diethylamino;

wherein n is an integer equal to 1 or 2;

with a secondary amine selected from an N-alkyl-amino-alkylsulfonic acid, an N-alkyl-amino-alkyl-carboxylic acid, the water-soluble salts thereof and mixtures of said acid and salts; and said secondary amine having the formula:

$$\overset{R}{\underset{|}{H-N}}-(CH_2)_a-A$$

wherein A represents a sulfonic acid or carboxylic acid moiety or a water-soluble salt thereof, R represents a lower alkyl group of 1 to 4 carbons and "a" represents an integer from 1 to 25 ;

said composition containing about 0.5 to 1.0 mole of said secondary amine per mole of said dye present in said composition.

2. A dyestuff composition according to claim 1 wherein said dye chromophore is selected from the anthraquinone, the phthalocyanine, the monoazo and the disazo series.

3. A dyestuff composition according to claim 2 wherein said secondary amine is an N-alkyl-amino-alkyl-sulfonic acid or the water-soluble salt thereof.

4. A dyestuff composition according to claim 2 wherein said secondary amine is N-methyltaurine or its water-soluble salt.

5. A dyestuff composition according to claim 2 wherein said dye has in the free acid form, the formula:

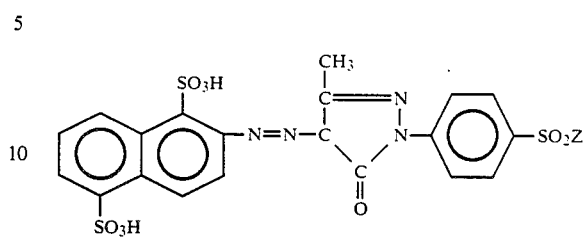

and said addition product is formed by reacting said dye with about 0.5 to about 1 mole of said secondary amine.

6. A dyestuff composition according to claim 2 wherein said dye has in the free acid form, the formula:

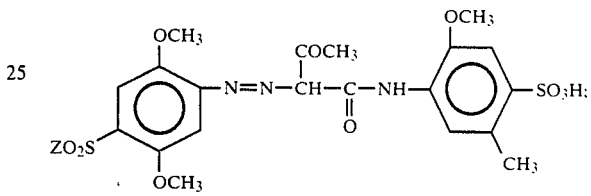

and said addition product is formed by reacting said dye with about 0.5 to about 1 mole of said secondary amine.

7. A dyestuff composition according to claim 2 wherein said dye has in the free acid form, the formula:

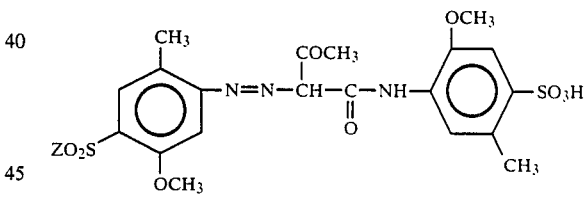

and said addition product is formed by reacting said dye with about 0.5 to about 1 mole of said secondary amine.

8. A dyestuff composition according to claim 2 wherein said dye has in the free acid form, the formula:

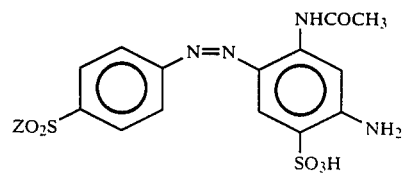

and said addition product is formed by reacting said dye with about 0.5 to about 1 mole of said secondary amine.

9. A dyestuff composition according to claim 2 wherein said dye has in the free acid form, the formula:

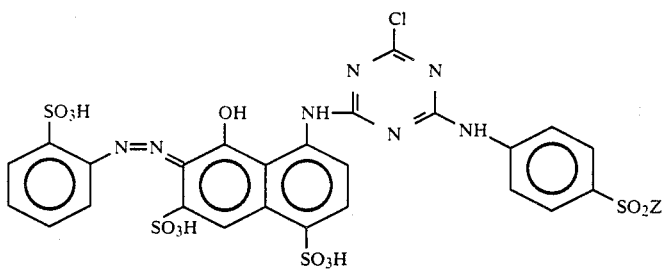

and said addition product is formed by reacting said dye with about 0.5 to about 1 mole of said secondary amine.

10. A dyestuff composition according to claim 2 wherein said dye has in the free acid form, the formula:

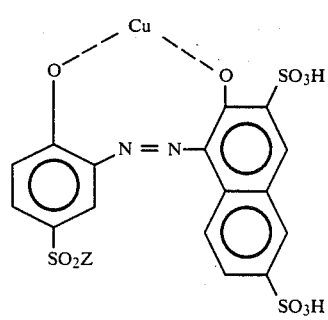

and said addition product is formed by reacting said dye with about 0.5 to about 1 mole of said secondary amine.

11. A dyestuff composition according to claim 2 wherein said dye has in the free acid form, the formula:

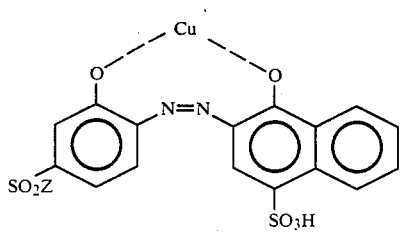

and said addition product is formed by reacting said dye with about 0.5 to about 1 mole of said secondary amine.

12. A dyestuff composition according to claim 2 wherein said dye has in the free acid form, the formula:

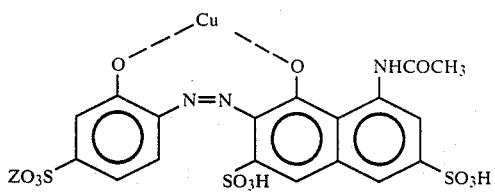

and said addition product is formed by reacting said dye with about 0.5 to about 1 mole of said secondary amine.

13. A dyestuff composition according to claim 2 wherein said dye has in the free acid form, the formula:

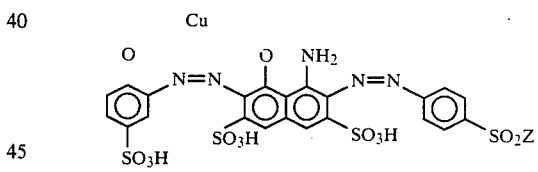

and said addition product is formed by reacting said dye with about 0.5 to about 1 mole of said secondary amine.

14. A dyestuff composition according to claim 2 wherein said dye has in the free acid form, the formula:

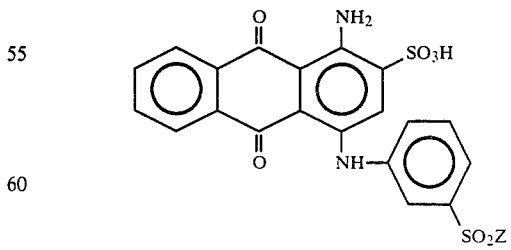

and said addition product is formed by reacting said dye with about 0.5 to about 1 mole of said secondary amine.

15. A dyestuff composition according to claim 2 wherein said dye has in the free acid form, the formula:

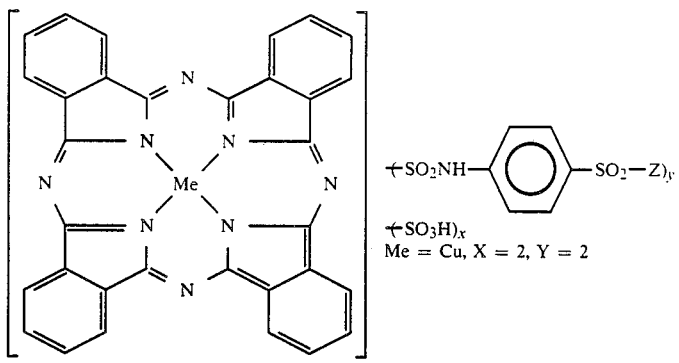

and said addition product is formed by reacting said dye with about 0.5 to about 1 mole of said secondary amine.

16. A dyestuff composition according to claim 2 wherein said dye has in the free acid form, the formula:

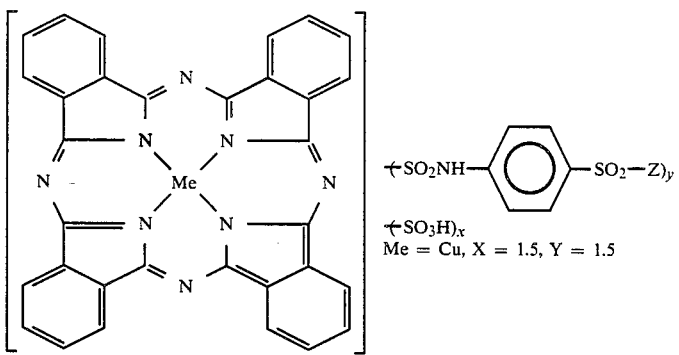

and said addition product is formed by reacting said dye with about 0.5 to about 1 mole of said secondary amine.

17. A dyestuff composition according to claim 2 wherein said dye has in the free acid form, the formula:

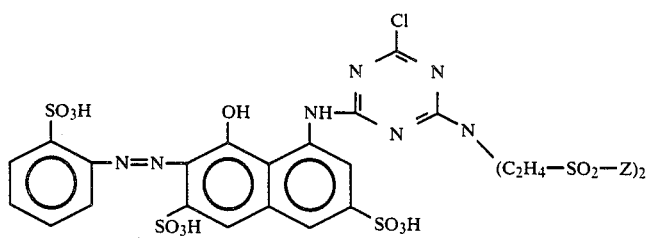

and said addition product is formed by reacting said dye with about 0.5 to about 1 mole of said secondary amine.

18. A dyestuff composition according to claim 2 wherein said dye has in the free acid form, the formula:

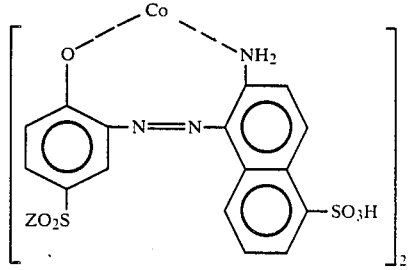

and said addition product is formed by reacting said dye with about 0.5 to about 1 mole of said secondary amine.

19. A mixture of at least two dyestuff compositions according to claim 1.

20. A mixture of at least two dyestuff compositions according to claim 2.

21. A mixture of at least two dyestuff compositions according to claim 3.

22. A mixture of at least two dyestuff compositions according to claim 4.

23. A mixture of at least two dyestuff compositions selected from the dyestuff compositions of claims 5, 6, 7, 8, 9, 10, 11, 12, 13, 14, 15, 16, 17 or 18.

24. A process for dyeing a synthetic polyamide fiber comprising:
a. reacting a water-soluble, fiber-reactive, vinyl-sulfone dye with from about 0.5 to about 1 mole of a secondary amine selected from the group consisting of N-alkyl of 1 to 5 carbons amino-alkyl of 1 to 25 carbons sulfonic acid, N-alkyl of 1 to 5 carbons amino-alkyl of 1 to 25 carbons carboxylic acid or the water-soluble salts thereof; and
b. dyeing said fiber with an aqueous solution of the reaction product of step (a) hereof under acidic conditions at a pH range from about 3 to about 4.

25. A process according to claim 24 wherein the dyeing process is conducted in a continuous manner.

26. A process according to claim 24 wherein said aqueous solution comprises at least two vinyl sulfone dyes of different colors.

27. A method for modifying a water-soluble, vinyl-sulfone dyestuff for the purpose of attaining a uniform color shade when said dyestuff is used to dye a synthetic polyamide fiber comprising
a. adding to said vinyl-sulfone dyestuff from about 0.5 to about 1 mole of a secondary amine selected from a N-alkyl of 1 to 5 carbons—amino-alkyl of 1 to 25 carbons—sulfonic acid, or N-alkyl of 1 to 5 carbons—amino-alkyl of 1 to 25 carbons—carboxylic acid or their water-soluble salts per mole of vinyl-sulfone dye in said dyestuff; and
b. said secondary amine being added in an amount effective to produce a uniform color shade after reaction with said vinyl-sulfone dye when applied to a synthetic polyamide fiber from an acidic aqueous solution having a pH value in the range of about 3 to 4 to dye to polyamide fiber.

28. A method according to claim 27 wherein at least two dyestuffs of different colors are to be used in combination to dye said polyamide fiber.

29. A method according to claim 27 wherein said dyestuffs are to be used to due a synthetic polyamide fiber by a continuous process.

* * * * *